United States Patent

Jones et al.

[11] Patent Number: 6,128,351
[45] Date of Patent: Oct. 3, 2000

[54] FILTER FOR MULTICARRIER COMMUNICATION SYSTEM AND METHOD FOR PEAK POWER CONTROL THEREIN

[75] Inventors: Alan Jones, Calne; Paul Golding, Wroughton, both of United Kingdom

[73] Assignee: Motorola, Inc., Schaumburg, Ill.

[21] Appl. No.: 08/973,883

[22] PCT Filed: May 15, 1997

[86] PCT No.: PCT/EP97/02486

§ 371 Date: Jun. 4, 1998

§ 102(e) Date: Jun. 4, 1998

[87] PCT Pub. No.: WO97/45987

PCT Pub. Date: Dec. 4, 1997

[30] Foreign Application Priority Data

May 24, 1996 [GB] United Kingdom ............... 9610941

[51] Int. Cl.[7] ............... H04L 27/10; H04B 15/00; H04K 1/02
[52] U.S. Cl. ............... 375/284; 375/285; 375/296
[58] Field of Search ............... 375/254, 260, 375/278, 284, 285, 296, 343; 455/501, 63

[56] References Cited

PUBLICATIONS

Jones et al "Block Coding Schemes for Reduction of Peak to Mean Envelope Power Ratio of Multicarrier Transmission Schemes", Electronic Letters, Dec. 8, 1994, vol. 30, No. 25, Dec. 8, 1994.

Enright et al, "OFDM Modem with Peak–to–Mean Power Ratio Reduction using Adaptive Clipping", HF Radio Systems and Techniques, Conference Publication, Jul. 1997.

Kim et al, "Clipping Noise Mitigation for OFDM by Decision–Aided Reconstruction", IEEE, vol. 3, No. 1, Jan. 1999.

*Primary Examiner*—Stephen Chin
*Assistant Examiner*—Albert Park
*Attorney, Agent, or Firm*—Kenneth A. Haas

[57] ABSTRACT

A communication device (60) for simultaneously transmitting independent information (82) on multiple channels comprises a modulator (66) and at least two matched filters (68–70). Each matched filter has a unique predetermined characteristic that is a time-reversed, complex conjugate of a complex waveform shape (72) produced by the modulator (66) in response to a channel encoder previously supplying known codeword vectors (75) to the modulator (66). Therefore, a composite signal envelope (82) produced for transmission by the communication device (60) of FIG. 4 has a reduced peak-to-mean envelope power ratio (PMEPR), since relatively large excursions in complex waveform shapes subsequently generated by the modulator (66) are unmatched by the unique filter characteristics while relatively small excursion are matched and therefore enhanced.

6 Claims, 3 Drawing Sheets

FILTER FOR MULTICARRIER COMMUNICATION SYSTEM AND METHOD FOR PEAK POWER CONTROL THEREIN

BACKGROUND OF THE INVENTION

This invention relates, in general, to multicarrier communication systems, such as an Orthogonal Frequency Division Multiplexed (OFDM) communication system, and is particularly applicable to a mechanism for controlling the peak-to-mean envelope power ratio (PMEPR) for transmissions in such systems.

SUMMARY OF THE PRIOR ART

Multicarrier transmission schemes, such as OFDM, have been proposed for many different types of communication system, including Digital Audio Broadcasting (DAB) and Broadband Wireless Local Area Networks (LANs). The advantage of such schemes is that unlimited transmission rates are theoretically possible in highly time dispersive channels that arise from a summation of multiple-delayed, phase-shifted paths for a signal, and which therefore display a distorted characteristic. Unfortunately, the composite signal envelope produced by OFDM exhibits a high PMEPR (which term is also commonly referred to as "the crest factor"). Moreover, in order to mitigate against the effects of distortion and spectral spreading (e.g. adjacent channel splatter) in multicarrier systems, a linear (and consequently inefficient) transmit amplifier is required for amplification of this composite signal envelope.

In addition to the foregoing disadvantages, the average power of a multicarrier signal (for a specified Peak Envelope Power (PEP) limit) is considerably lower than that for a constant envelope, single carrier signal (such as a Gaussian Minimum Shift-Keyed (GMSK) signal used in cellular communication systems, for example). Consequently, the selection of a multicarrier transmission scheme for a system does not currently utilise the available power range to a maximum extent.

As such, there is a desire to reduce the PMEPR of multicarrier transmission schemes in order to obtain the inherent advantages associated with the use of multicarrier signals in the limited frequency spectrum available to communication systems, generally.

SUMMARY OF THE INVENTION

According to a first aspect of the present invention there is provided a communication device for simultaneously transmitting independent information on multiple channels as a composite signal envelope, the communication device comprising: a modulator for generating complex waveform shapes in response to data sequences applied thereto; and at least two matched filters each having a predetermined filter characteristic that is a time-reversed, complex conjugate of a complex waveform shape produced by the modulator in response to predetermined codeword vectors applied to the modulator; whereby a combined effect of the predetermined filter characteristics reduces a peak-to-mean envelope power ratio (PMEPR) of the composite signal by causing relatively large excursions in the complex waveform shapes produced by the data sequences to be unmatched in the at least two filters, while relatively small excursion in the complex waveform shapes are matched and therefore enhanced.

Typically, the predetermined codeword vectors include vectors representative of extreme complex waveform shapes generated by the modulator in response to data sequences applied thereto.

The present invention advantageously provides a mechanism which can achieve significant improvements in the PMEPR by avoiding excessive PEPs, while enhancing small excursion in complex waveform shapes generated by the modulator.

In a second aspect of the present invention there is provided a receiver for receiving the composite signal envelope of claim 1, wherein the receiver comprises a frequency domain filter having reciprocal filter characteristics to those of the at least two filters of claim 1.

In another aspect of the present invention there is provided a filter for a communication device arranged to simultaneously transmit independent information on multiple channels as a composite signal envelope, the communication device comprising a modulator for generating complex waveform shapes in response to data sequences applied thereto, the filter having a predetermined characteristic that is a time-reversed, complex conjugate of a complex waveform shape produced by the modulator in response to predetermined codeword vectors applied to the modulator, whereby a combination of such predetermined characteristics has the effect of reducing a peak-to-mean envelope power ratio (PMEPR) of the composite signal by causing large excursions in the complex waveform shapes produced by the data sequences to be unmatched in the filter, while small excursion in the complex waveform shapes are matched and therefore enhanced.

In a further aspect of the present invention there is provided a method of simultaneously transmitting independent information on multiple channels as a composite signal envelope, the method comprising the steps of: generating complex waveform shapes in a modulator in response to data sequences applied to the modulator; and filtering the complex waveform shapes in at least two filters having predetermined filter characteristics that are time-reversed, complex conjugates of complex waveform shapes produced by the modulator in response to predetermined codeword vectors applied to the modulator, whereby a combined effect of the predetermined filter characteristics reduces a peak-to-mean envelope power ratio (PMEPR) of the composite signal by causing relatively large excursions in the complex waveform shapes produced by the data sequences to be unmatched in the at least two filters, while relatively small excursion in the complex waveform shapes are matched and therefore enhanced.

An exemplary embodiment of the present invention will now be described with reference to the accompanying drawings.

DETAILED DESCRIPTION OF A PREFERRED EMBODIMENT

Figure 1:
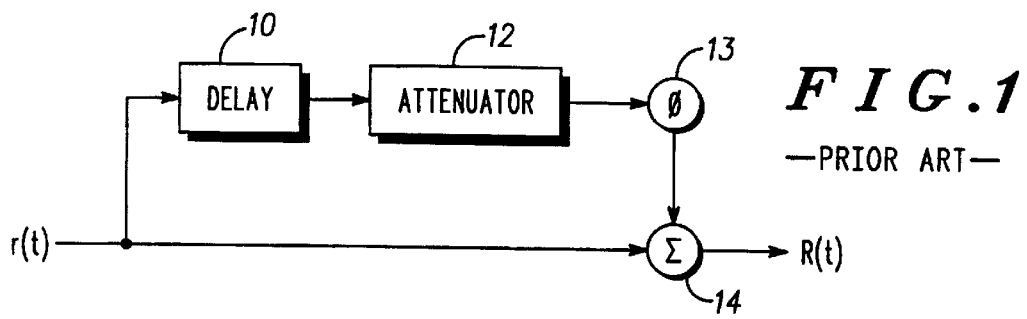
FIG. 1 is a physical representation of the mechanism by which a prior art time dispersive channel is formed.

Referring to FIG. 1, there is shown a physical representation of the mechanism by which a prior art time dispersive channel is formed. Explicitly, a data signal r(t) is subjected to a multiplicity of paths (only two of which are shown), one of which contains a time delay 10, an attenuator 12 and a phase offset 13. At a later point, the multiplicity of alternate paths are combined (as represented by summation block 14) to obtain a distorted signal R(t). As will be understood, as the bandwidth for the data signal r(t) increases, the period of the time delay effects the signal to a greater extent, and so limits the use of an available bandwidth.

Figure 2:
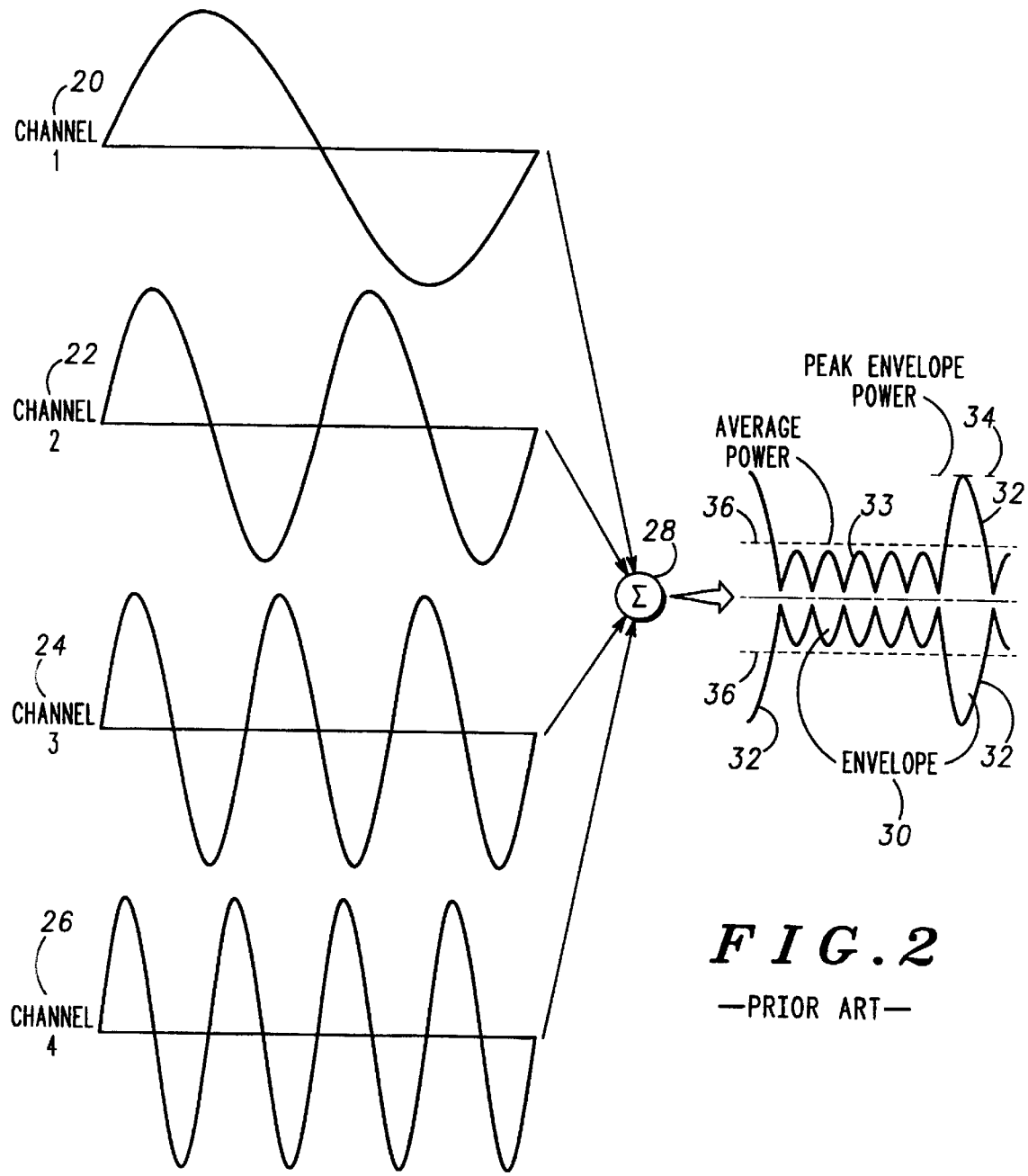
FIG. 2 is a waveform diagram illustrating the formulation of a time domain signal of a prior art multicarrier system.

FIG. 2 is a waveform diagram illustrating the formulation of a time domain signal of a prior art multicarrier system. Indeed, FIG. 2 is representative of an OFDM scheme in which the effects of the time delay are mitigated against by distributing data (not shown) amongst a plurality of frequency channels 20–26 (four channels in this particular instance). Typically, a frequency relationship exists between the frequency of a first channel (channel 1) and the other channels in the scheme, i.e. channel 2 is twice the frequency of channel 1, while channel 3 has thrice the frequency of channel 1 (and so on). Distribution of data in this fashion has the effect that each channel is less susceptible to the inherent delay spread, as will be understood. Superposition of individual signals from each channel (occurring in summation block 28) therefore produces a composite envelope 30 having power spikes 32 separated by a relatively low (but oscillating) signal profile 33. However, the power spikes 32 have a peak envelope power (PEP) 34 substantially greater in value than an average power level 36 for the entire composite envelope 30.

Figure 3:
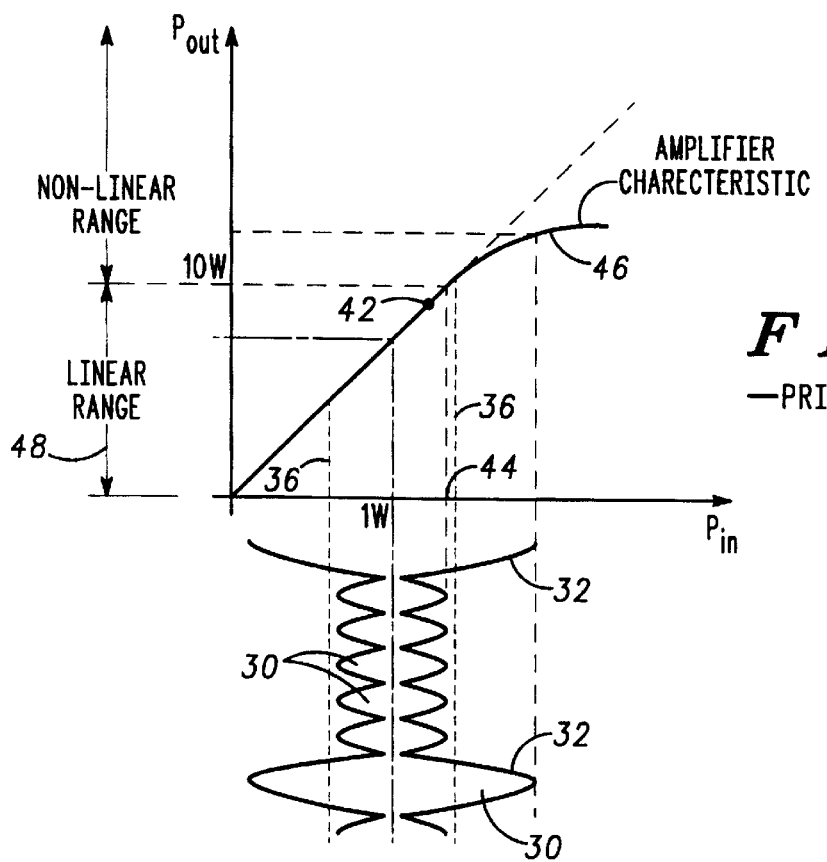
FIG. 3 shows an operating characteristic and quiescent point of a typical linear amplifier for the time domain signal of the multicarrier system of FIG. 2.

Turning now to FIG. 3, an operating characteristic 40 and quiescent point 42 of a typical linear amplifier (not shown) for the time domain signal of the multicarrier system of FIG. 2 is shown. As will be appreciated, a linear amplifier provides a limited, linear gain between an input signal and an output signal. At a certain input power (Pin) threshold 44, non-linearities 46 in the amplification occur. In order to optimise the use of the linear amplifier in, for example, communications systems requiring linear transmitters (or the like), an input signal (in this case the time domain representation of the composite envelope 30) is positioned about the quiescent point 42. More particularly, the composite envelope 30 is arranged such that its average power level 36 provides (when taking into account the gain of the amplifier) a desired output level, and whereby a majority of the signal envelope 30 is within a linear range 48 of the amplifier. Unfortunately, the PEP 34 of power spikes 32 exceeds the linear range of operation of the amplifier with the effect that information contained thereon is distorted by the non-linearity 46 of the amplifier. More crucially though, standards bodies, such as ETSI (the European Technical Standards Institute) may require operational compliance to specified a maximum transmit power output level, say 10 watts. Therefore, to accommodate the relatively high (but relatively infrequent) PEPs of the power spikes 32, the input signal (composite envelope 30) requires the re-positioning of the quiescent point 42 to a lower level, whereby the amplification of the average transmit power is reduced and the range of the transmitter (in which the linear amplifier is used) diminished accordingly.

Figure 4:
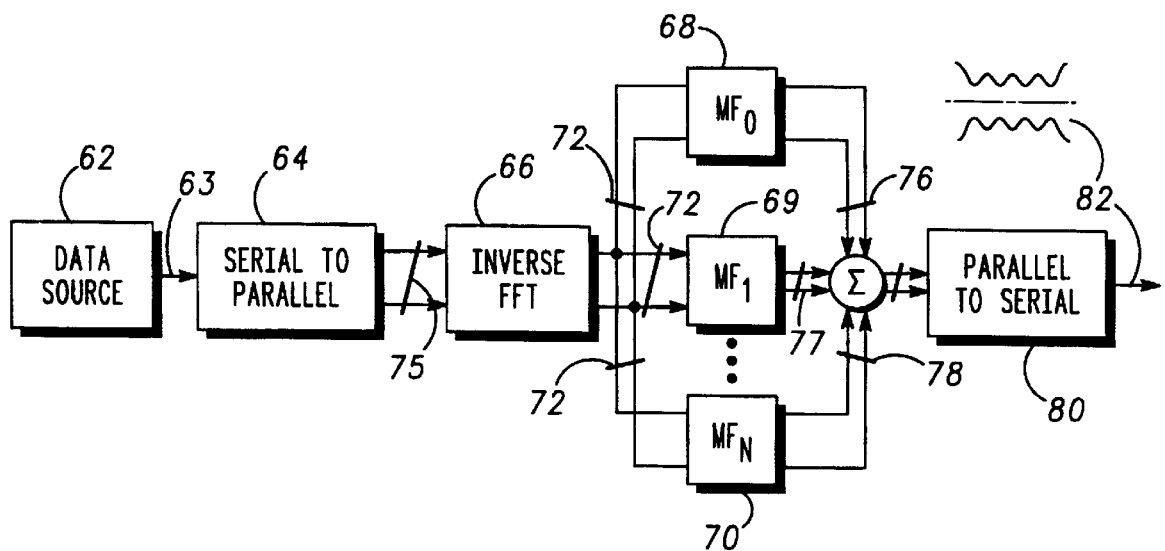
FIG. 4 is a block diagram of a multicarrier transmitter in accordance with a preferred embodiment of the present invention.

FIG. 4 is a block diagram of a multicarrier transmitter 60 in accordance with a preferred embodiment of the present invention. The multicarrier transmitter comprises a data source 62 for generating a data stream 63, a serial-to-parallel converter 64 that converts the data stream 63 into parallel data words, at least one modulator 66 (implemented in the preferred embodiment of the present invention as an inverse Fast Fourier Transform (FFT) block), a bank of N matched filters 68–70 each receiving identical modulated outputs 72 from the at least one modulator 66, a combiner 74 for summing together filtered outputs 76–78 from each of the individual bank of N matched filters 68–70, and a parallel-to-serial converter 80 that provides, ultimately, an output signal having a composite signal envelope 82 suitable for transmission. Each matched filter in the bank of N matched filters 68–70 is dedicated to a particular channel.

For the sake of clarity, a channel encoder required within such a transmit chain has been omitted, although it will be appreciated that such a channel encoder would usually be positioned between the serial-to-parallel converter 64 and the at least one modulator 66. Typically, the channel encoder will perform block encoding (or the like) on the parallel data words to generate codeword vectors (data sequences) 75, while the at least one modulator 66 is arranged to service particular channel frequencies and to ensure that a spacing between channels is orthogonal, i.e. there is no interference between channels (carriers). Operational control of the multicarrier transmitter is performed by a microprocessor (not shown), as will be readily understood. Also, the skilled addressee will appreciate that the inverse FFT function would typically be implemented within an Application Specific Integrated Circuit (ASIC) containing a microprocessor engine.

The bank of N matched filters (68–70) must contain at least two matched filters, each having an unique predetermined characteristic deduced from output signatures (72) generated by the at least one modulator 66 (i.e. by the inverse FFT function) in response to the channel encoder previously supplying known codeword vectors 75 to inputs of the at least one modulator 66. Particularly, the output signatures 72 are envelope shapes generated by the modulator 66 in response to these known codeword vectors 75. According to the present invention, the predetermined characteristic of each matched filter is a time-reversed, complex conjugate of the complex output waveform (i.e. the output signature 72) emanating from each modulator 66 in response to the application of these known (and selected) codeword vectors 75. Since the number of matched filters 68–70 is determined by the number of channels in the OFDM system, the arrangement of the unique filter characteristics is typically ordered to correspond to a regular step-wise progression between the extreme output signatures, although this need not be the case.

Figure 5:
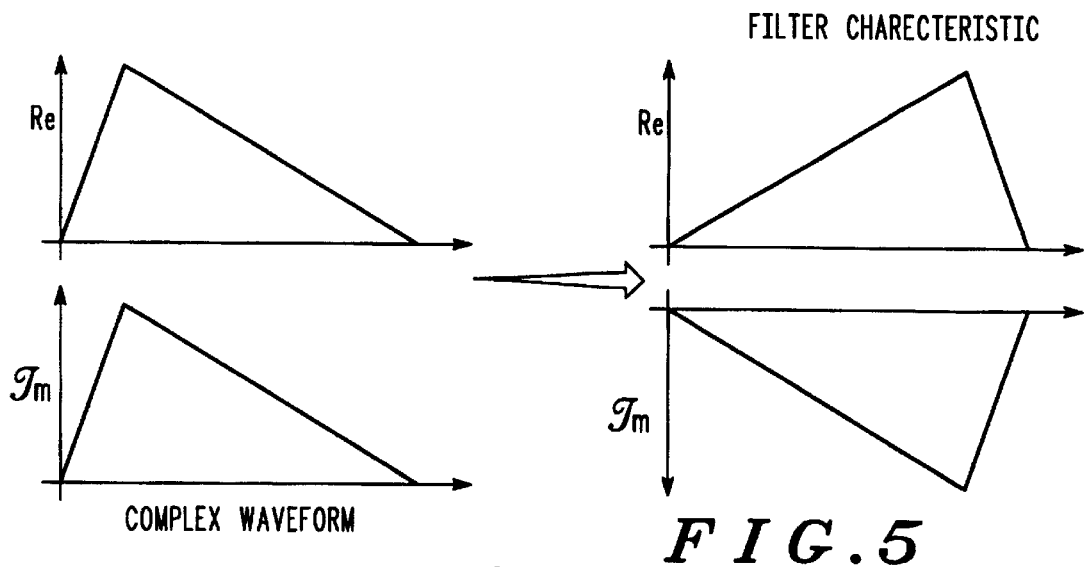
FIG. 5 is a graphical representation indicative of the format of filter transfer characteristic required in the multicarrier transmitter of FIG. 4.

FIG. 5 is a graphical representation indicative of the format of filter transfer characteristic required in the multicarrier transmitter of FIG. 4. Specifically, a simplified triangular time-domain function illustrates the time-reversal of the complex conjugate of the complex output of the modulator 66 for both the real (Re) and imaginary (Im) portions of the filter characteristic.

The result of utilising the matched filter characteristics and arrangement of the present invention is that large PEPs are unmatched by the matched filters 68–70, whereas the intervening, relatively small signal puturbations are matched and therefore enhanced (in terms of amplitude). The present invention provides a significant performance advantage over existing multicarrier systems, with simulated results showing an improvement in the range of 3 dB and greater.

In mathematical format, the composite signal envelope 82 of the multicarrier signal can be expressed as:

$$u(t) = \sqrt{r(t)r^*(t)}$$

in which $$r(t) = \sum_{i=0}^{N} s_i(t) e^{j(2\pi f_i(t) + \phi_i(t))}$$

and r*(t) is the complex conjugate; $s_i(t)$ is the parallel data of the $i^{th}$ carrier; $f_i$ is the frequency of the $i^{th}$ carrier; and $\phi_i(t)$ is a phase function of the $i^{th}$ carrier (i.e. the phase offset arising from the frequency synthesization process for the $i^{th}$ carrier). Furthermore, the linear channel h(t) provided by the summation of the individual filtered outputs 76–78 can be expressed as:

$$h(t) = \sum_{i=1}^{N} h_i(t)$$

where $$h_i(t) = h_{dec}^*(-t)$$

is indicative of the complex impulse response (i.e. the time-reversed, complex conjugate of the complex output) matched to the composite signal waveform r(t) for a particular codeword vector designated by the subscript dec in the range 0 to $(2^N-1)$. Hence, after the linear channel, the complex signal envelope r'(t) 82 produced for transmission by the transmitter 60 is given by the expression:

$$r'(t) = r(t) \otimes h(t)$$

where ⊗ denotes a time-domain convolution.

In other words, the effect of the summation of the filtered outputs is to replicate a radio channel because each matched filter introduces a delayed, phase-shifted and attenuated signal that emerges from a non-correlated path.

In order to avoid excessive PEPs (and the problems associated with its periodic appearance), use of the matched filter arrangement and related filter characteristics of the preferred embodiment of the present invention has the effect of reducing large excursions in the composite signal envelope 82 (by attenuating power spikes 32 of the PEP) while enhancing small excursions of the previous, relatively low (but oscillating) signal profile 33. Consequently, there is an increase in the average power of the composite signal envelope 82 and a reduction of the PMEPR in the output signal.

Figure 6:
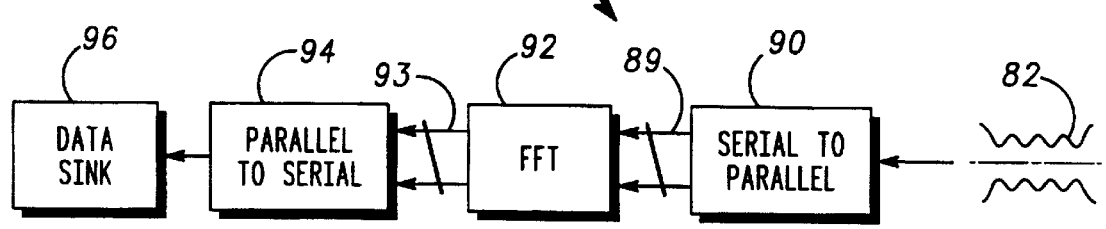
FIG. 6 is a block diagram of a prior art multicarrier receiver which may be used to receive a composite signal envelope produced by the transmitter of FIG. 4.

Advantageously, the composite signal envelope 82 produced by the matched filter arrangement of the present invention may be received by a conventional multicarrier receiver 88, as shown in FIG. 6. The receiver 88 is arranged to receive a multicarrier signal having the composite signal envelope 82. The received signal is firstly converted into parallel data words 89 in a serial-to-parallel converter 90. These data words 89 are then demodulated in an appropriate demodulator 92 (such as by performing a Fast Fourier Transform). Subsequently, decoded data words 93 are applied to inputs of a parallel-to-serial converter 94 before being output, ultimately, to a data sink 96, such as a visual display or audio circuitry. Again, for the sake of clarity and brevity, the channel decoding block has been omitted. Operational control of the multicarrier receiver 88 is typically performed by a microprocessor (not shown), as will be readily understood.

Clearly, the reception capability of existing receivers beneficially allows for gradual system migration. Furthermore, since each matched filter can be considered as providing a distinct ODFM symbol, a communication system utilising the present invention has no intersymbol interference and allows reception without signal degradation.

Figure 7:
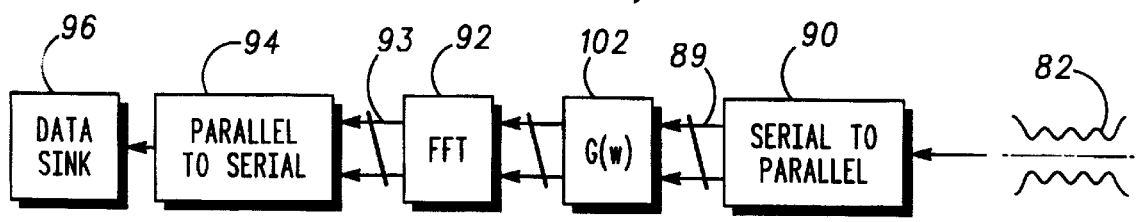
FIG. 7 is a block diagram of a multicarrier receiver in accordance with a preferred embodiment of the present invention.

As an alternative to a conventional receiver, FIG. 7 is a block diagram of a multicarrier receiver 100 in accordance with a preferred embodiment of the present invention. The multicarrier receiver 100 is substantially identical to the conventional multicarrier receiver 88 previously described with reference to FIG. 6, but also includes a frequency domain filter (G(ω)) 102 located between the serial-to-parallel converter 90 and the demodulator 92. The filter characteristics for this frequency domain filter must necessarily be the inverse of those filter characteristics used in the matched filters 68–70 of the transmitter 60. In mathematical form, the frequency domain filter has an overall characteristic:

$$G(\omega) = \frac{1}{\sum_{i=1}^{N} H_i(\omega)}$$

in which $$H_i(\omega) = F\{h_n(t)\}$$

where F is the Fourier transform of the $n^{th}$ matched filter impulse response, and ω is the angular displacement in radians.

Figure 8:
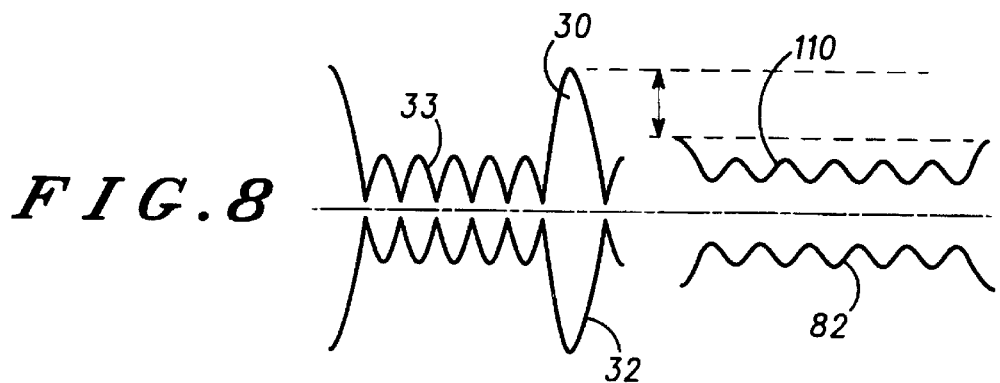
FIG. 8 is a graphical representation contrasting a time domain representation of a waveform developed by the multicarrier transmitter of FIG. 4 with the time domain signal of the multicarrier system of FIG. 2.

FIG. 8 is a graphical representation contrasting a time domain representation of a waveform developed by the multicarrier transmitter of FIG. 4 with the time domain signal of the multicarrier system of FIG. 2. In contrast with the prior art time domain envelope 30, attenuation by the individual filter characteristics for each channel has the effect of reducing the PMEPR (as illustrated), and increasing the average power transmitted in the composite signal envelope 82. Furthermore, the composite envelope 82 of the present invention has reduced PEP spikes that are separated by a region having a new signal profile 110 that perturbates less vigorously than that of the prior art composite envelope 30.

Use of the matched filter arrangement of the present invention advantageously permits the use of linear amplifiers in a more efficient manner, since the PEP value of the composite signal envelope 82 is reduced and the peak-to-peak variation in power of the composite signal envelope 82 is corresponding reduced. These reductions in the power profile of the envelope provide the ability to operate the amplifier at a quiescent point towards its non-linear range, and do not require clipping of the amplifier. Furthermore, there is an increase in a transmitting range for a transmitter utilising the present invention, since the average power in the composite signal envelope 82 is increased. Also, use of the matched filter arrangement of the present invention does not degrade spectral efficiency, and no additional information bearing sub-carrier channels are required.

In addition, the segmentation of broadband data and its transmission over multiple, narrow-band carriers (channels) eliminates the need for high speed equalisers in communication systems.

Although FIG. 4 is a block diagram of a multicarrier transmitter 60 constructed in accordance with a preferred embodiment of the present invention, it will be appreciated that the present invention is not limited to uni-directional communication devices, and that a multicarrier transceiver could equally well be constructed from a combination of the multicarrier transmitter 60 and one of the multicarrier receivers shown in FIGS. 6 and 7, as will be understood.

It will, of course, be understood that the above description has been given by way of example only and that modifications in detail may be made within the scope of the invention. For example, although the above description discusses the invention in the general context of a radio transmission, it will be appreciated that the multicarrier system may utilise fibre-optic technology as a communication resource for the multiple information carriers.

What is claimed is:

1. A communication device for simultaneously transmitting independent information on multiple channels as a composite signal envelope, the communication device comprising:

a modulator for generating complex waveform shapes in response to data sequences applied thereto; and at least two matched filters each having a predetermined filter characteristic that is a time-reversed, complex conjugate of a complex waveform shape produced by the modulator in response to predetermined codeword vectors applied to the modulator;

whereby a combined effect of the predetermined filter characteristics reduces a peak-to-mean envelope power ratio (PMEPR) of the composite signal by causing relatively large excursions in the complex waveform shapes produced by the data sequences to be unmatched in the at least two filters, while relatively small excursion in the complex waveform shapes are matched and therefore enhanced.

2. The communication device of claim 1, further comprising a combiner for combining together output signals from the at least two matched filters.

3. The communication device of claim 1 or 2, wherein the predetermined codeword vectors include vectors representative of extreme complex waveform shapes generated by the modulator in response to data sequences applied thereto.

4. The communication device of claim 3, wherein the predetermined filter characteristics are ordered to correspond to a step-wise progression between the extreme complex waveform shapes.

5. A filter for a communication device arranged to simultaneously transmit independent information on multiple channels as a composite signal envelope, the communication device comprising a modulator for generating complex waveform shapes in response to data sequences applied thereto, the filter having a predetermined characteristic that is a time-reversed, complex conjugate of a complex waveform shape produced by the modulator in response to predetermined codeword vectors applied to the modulator, whereby a combination of such predetermined characteristics has the effect of reducing a peak-to-mean envelope power ratio (PMEPR) of the composite signal by causing relatively large excursions in the complex waveform shapes produced by the data sequences to be unmatched in the filter, while relatively small excursion in the complex waveform shapes are matched and therefore enhanced.

6. A method of simultaneously transmitting independent information on multiple channels as a composite signal envelope, the method comprising the steps of:

generating complex waveform shapes in a modulator in response to data sequences applied to the modulator; and filtering the complex waveform shapes in at least two filters having predetermined filter characteristics that are time-reversed, complex conjugates of complex waveform shapes produced by the modulator in response to predetermined codeword vectors applied to the modulator, whereby a combined effect of the predetermined filter characteristics reduces a peak-to-mean envelope power ratio (PMEPR) of the composite signal by causing relatively large excursions in the complex waveform shapes produced by the data sequences to be unmatched in the at least two filters, while relatively small excursion in the complex waveform shapes are matched and therefore enhanced.

* * * * *